(12) United States Patent
Scipioni et al.

(10) Patent No.: US 10,521,836 B2
(45) Date of Patent: *Dec. 31, 2019

(54) PROXY SHOPPING REGISTRY

(71) Applicant: PAYPAL, INC., San Jose, CA (US)

(72) Inventors: German Carlos Scipioni, San Jose, CA (US); Byong Mok Oh, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/626,879

(22) Filed: Jun. 19, 2017

(65) Prior Publication Data

US 2017/0287026 A1 Oct. 5, 2017

Related U.S. Application Data

(63) Continuation of application No. 13/483,966, filed on May 30, 2012, now Pat. No. 9,684,912.

(51) Int. Cl.
*G06Q 30/00* (2012.01)
*G06Q 30/06* (2012.01)
*G06Q 50/00* (2012.01)

(52) U.S. Cl.
CPC ........ *G06Q 30/0601* (2013.01); *G06Q 50/01* (2013.01)

(58) Field of Classification Search
CPC .............................. G06Q 30/06–08
USPC ............................ 705/26.1–27.2
See application file for complete search history.

(56) References Cited

U.S. PATENT DOCUMENTS

| 9,684,912 | B2 * | 6/2017 | Scipioni | G06Q 50/01 |
| 2013/0211953 | A1 * | 8/2013 | Abraham | G06Q 30/06 |
| | | | | 705/26.8 |
| 2013/0325663 | A1 | 12/2013 | Scipioni et al. | |

* cited by examiner

*Primary Examiner* — Ethan D Civan
(74) *Attorney, Agent, or Firm* — Haynes and Boone, LLP (57) ABSTRACT

Methods and systems are provided for facilitating purchases by one person for another person. A user can take advantage of one or more social networks to facilitate purchases by proxy shoppers for the user. For example, the user can designate what products can be purchased by a proxy shopper and what stores can be used by the proxy shopper to make the purchases. The products can be listed in a registry on the user's social network. When the proxy shopper is in a designated store, the proxy shopper can purchase a designated products for the user.

20 Claims, 4 Drawing Sheets

PROXY SHOPPING REGISTRY

CROSS REFERENCED TO RELATED APPLICATIONS

This continuation patent application claims priority to and the benefit of U.S. patent application Ser. No. 13/483,966, filed May 30, 2012, which will issue as U.S. Pat. No. 9,684,912 on Jun. 20, 2017 the contents of which are incorporated by reference in its entirety.

BACKGROUND

Technical Field

The present disclosure generally relates to electronic commerce and, more particularly, relates to a system and method for facilitating purchases by one person for another person.

Related Art

It is often desirable for one person to have another person make a purchase for them. This can be done when one person cannot or does not want to go to a store and the other person is going to the store anyway. For example, one person may need eggs and milk to bake a birthday cake. The other person may be going to the supermarket for their own reasons. It would often be desirable to have the other person pick up the eggs and milk. In this way, the person baking the birthday cake does not need to make a special trip to the supermarket just to pick up these products. The other person can be a friend, relative, neighbor, or co-worker of the person baking the birthday cake.

By having others make such purchases, money can be saved (such as the money needed to buy gas for the trip to the store) and pollution can be decreased (such as the air pollution caused by burning the gas on the way to and from the store). Further, by having others make such purchases convenience can be greatly increased. On a larger scale, other advantages are possible. For example, traffic congestion can be mitigated.

Social networks are well known. Social networks allow members to readily communicate with each other. By using a social network, messages can be quickly disseminated to a large number of people, e.g., members of the social network. It would be desirable to take advantage of one or more social networks, so as to facilitate purchases by one person for another person.

SUMMARY

According to one or more embodiments, methods and systems are provided for facilitating purchases by one person, e.g., a proxy shopper, for another person, e.g., a user. The user can take advantage of one or more social networks to facilitate purchases by one or more proxy shoppers for the user. For example, the user can designate what products can be purchased by the proxy shoppers and what stores can be used by the proxy shoppers. The products can be listed in a registry, such as on the user's social network. The user and the proxy shoppers can be members of the same social network. When one of the proxy shoppers is in or near, e.g., is proximate, a designated store, the proxy shopper can purchase the designated products for the user. A global positioning system (GPS), such as a GPS of a mobile device of one of the proxy shoppers, can be used to determine when the proxy shopper is proximate one of the designated stores.

According to one or more embodiments, a system can include a memory for storing account information for a user in a user account. The account information can include an identification of one or more proxy shoppers, a list of products authorized or designated for purchase by the proxy shoppers, and a list of stores authorized or designated for use by the proxy shoppers. Identification information for any number of proxy shoppers can be stored in the memory. Any number of stores can be authorized or designated for use by the proxy shoppers. Different stores can be authorized or designated for use by each individual proxy shopper. Alternatively, each proxy shopper can use all of the designated stores.

In one or more embodiments, a processor can be operable to receive a communication including an indication of a product purchased by a purchaser at a store, access an account of the user, determine from information in the account if the purchaser is a proxy shopper of the user, if the product is a product designated for purchase by the proxy shopper, and if the store is a store designated for use by the proxy shopper. The processor can remove the product from the list of products and authorize payment from an account of the user to an account of the proxy shopper if the purchaser is a proxy shopper of the user, the product is designated for purchase by the proxy shopper, and the store is designated for use by the proxy shopper. The user and the proxy shopper can be members of the same social network.

In one or more embodiments, the memory can be a memory of a payment server and the processor can be a processor of the payment server. The memory and the processor can be of the same payment server or can be of different payment servers. The payment server can be a payment server of a payment provider, such as Paypal, Inc. The memory can be a memory of any computer system or network. The processor can be a processor of any computer system.

The identification of the proxy shoppers can include an account of the proxy shoppers. The identification of proxy shoppers can include a payment provider account number. The identification of proxy shoppers can include a card account, e.g., a credit card account number, of the proxy shoppers. The proxy shoppers can be identified in any desired manner. For example, the proxy shoppers can be identified by their names, social security numbers, or driver's license numbers.

The account of the user can be a credit card account, a payment processor account, or a bank account. The account of the user can be any type of account that can be used to facilitate payment from the user to the proxy shoppers.

By having others make such purchases, money can be saved and pollution can be decreased. Further, by having others make such purchases convenience can be greatly increased. The user is not required to make as many trips. On a larger scale, other advantages are possible. For example, traffic congestion can be mitigated, the need for road maintenance can be mitigated, and fewer new roads need to be built.

DETAILED DESCRIPTION

According to an embodiment of the present invention, methods and systems are provided for facilitating purchases by one person for another person. The person making such purchases can be referred to herein as a proxy shopper. The person for whom the purchases are made can be referred to herein as a user.

As discussed above, it is often desirable for the proxy shopper make a purchase for the user. The proxy shopper can be a friend, relative, or co-worker of the user. The proxy shopper can have any relationship with respect to the user. For example, the proxy shopper can be an employee or agent of the user. The proxy shopper can be a professional, e.g., paid, proxy shopper. There can be any number of proxy shoppers for a given user. The proxy shopper can proxy shop for any number of users.

The user can be a single person or a group of people. For example, the user can be a family, a business, a club, or any other group of people. The user can also be a proxy shopper for someone else.

According to an embodiment, the user can take advantage of one or more social networks to facilitate purchases by the proxy shopper for the user. For example, the user can designate what products can be purchased by the proxy shopper for the user and what stores can be used by the proxy shopper to make such purchases. The products can be listed in a registry on the user's social network, on a mobile device of the proxy shopper, in a cloud, or anywhere else. The list can be provided to the user's social network, a list of the user's friends, or any other group of people. Different lists can be provided to different groups.

The products can be listed in any manner that is available to the proxy shoppers. The products can be listed on a website of the user, on any other website, or in any other manner that can be readily communicated to the proxy shoppers.

The store can be a brick and mortar store or can be an online store. The store can be any store that can be designated by the user and shopped at by the proxy shopper.

Stores can be designated by type, name, location, geographic area, or in any other manner. For example, all grocery stores in the city of Burbank, California can be designated. As a further example, the 7-Eleven located at 1123 Harbor Blvd., in Costa Mesa, Calif. can be designated.

When a proxy shopper is at a designated store, the proxy shopper can be presented with a list of products that the user desires to have purchased. The proxy shopper can be presented with the list by viewing the user's social network site, by viewing the user's website, or by any other method. The proxy shopper be presented with the list on a mobile device of the proxy shopper, such as a cellular telephone (either by voice, text message, viewing a website, e.g., a social networking site, or any other method), tablet computer, or the like. The proxy shopper can be presented with the list by the merchant, such as on a display of the merchant at checkout or prior to checkout.

A notification can be transmitted, such as via the operation of one or more processors, to the proxy shopper prior to the product being purchased. The notification can be transmitted when the proxy shopper is in proximity to or in a store designated by the user. The notification can comprise a request for the proxy shopper to purchase an item from the list of products.

Figure 1:
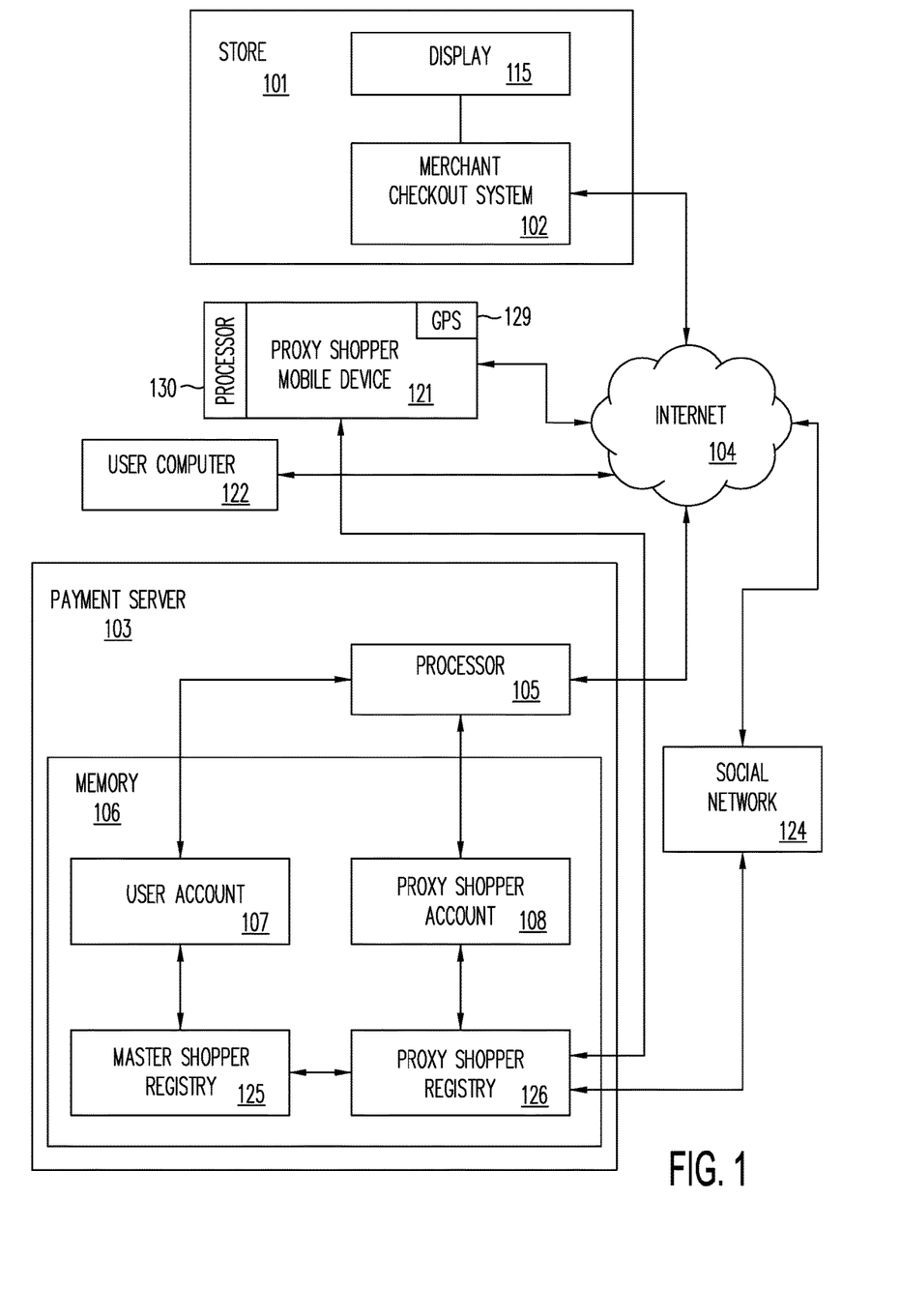
FIG. 1 is a block diagram showing a proxy shopping registry system, in accordance with one or more embodiments.

FIG. 1 is a block diagram showing a proxy shopping registry system, according to an embodiment. The system can include a store 101 having a merchant checkout system 102. The merchant checkout system 102 can have a display 115. The store 101 can be a brick and mortar store, a virtual store, an online store, or any other type of store.

A payment server 103 can facilitate payment from the proxy shopper to the merchant for the products purchased. The same payment server 103, or a different payment server 103, can facilitate payment from the user to the proxy shopper. The payment server 103 can belong to a payment provider, such as Paypal, Inc.

The payment server 103 can have a processor 105 in communication with a memory 106. The memory 106 can contain a database. The processor 105 can access a user account 107 and a proxy shopper account 108. Information regarding the user account 107 and the proxy shopper account 108 can be stored in the database of memory 106 or can be stored anywhere else. Information regarding the user account 107 and the proxy shopper account 108 can be stored in the same place as each other or can be stored in different places with respect to each other, e.g., in different databases and/or servers. The user account 107 and the proxy shopper account 108 can be with the same card company or payment provider. The user account 107 and the proxy shopper account 108 can be with different card companies or payment providers.

The user account 107 can contain and/or communicate with a master shopper registry 125. The proxy shopper account 108 can contain and/or communicate with a proxy shopper registry 126. The master shopper registry 125 can contain a list of all proxy shoppers for the user, a list of designated stores for each proxy shopper, and a list of designated products for each proxy shopper. The master shopper registry 125 can contain such information for a plurality of users. Thus, the master shopper registry 125 can be a comprehensive database for the proxy shopping system. The master shopper registry 125 can be stored in the memory 106 of the payment server 103. The master shopper registry 125 can be stored in a database of the memory 106.

The proxy shopper registry 126 can contain a list of the designated products and the designated stores for a particular proxy shopper. The proxy shopper registry 126 can be stored in the memory 106. The proxy shopper registry 126 can be part of the master registry 125. The proxy shopper registry 126 can be stored in the proxy shopper mobile device 121. The proxy shopper registry 126 can be stored by the social network 124. The proxy shopper registry 126 can be stored in any combination of the memory 106, the proxy shopper mobile device 121, and the social network 124.

The proxy shopper registry 126 can be created, stored, maintained, and provided for viewing by the proxy shopper on any list of friends, web site, or server. The proxy shopper registry 126 can be created, stored, maintained, and provided for viewing by the proxy shopper in any suitable manner.

The proxy shopper registry 126 can be maintained, e.g., created and updated, in the memory 106, the proxy shopper mobile device 121, and/or the social network 124. Thus, the user can create the proxy shopper registry 126 in one of the memory 106, the proxy shopper mobile device 121, and the social network 124 and the proxy shopper registry 126 can subsequently be communicated to the others of the memory 106, the proxy shopper mobile device 121, and the social network 124.

For example, the proxy shopper registry 126 can be part of the master registry 125 and can be created and updated in the memory 106 of the payment server 103. The proxy shopper registry 126 can be communicated from the payment server 103 to the social network 124, the merchant checkout system 102, the user computer 122, and/or the proxy shopper mobile device 121.

The merchant checkout system 102 can communicate with the payment server 103, such as via a network. For example, the merchant checkout system 102 can communicate with the payment server 103 via the Internet 104. The merchant checkout system 102 can communicate with a plurality of different the payment servers 103. The plurality of different payment servers 103 can communicate among themselves and can be considered the same as a single payment server 103 herein.

A proxy shopper mobile device 121 can communicate with the payment server 103, a user computer 122, and the merchant checkout system 102. The mobile device 121 can be a cellular telephone or a portable computer, for example. The mobile device 121 can communicate with the payment server 103, the user computer 122, and the merchant checkout system 102 via the Internet 104, for example.

The proxy shopper mobile device 121 can have a processor 130 and a global positioning system (GPS) 129. The GPS 129 can be used to determine when the proxy shopper is proximate a designated store. For example, the GPS 129 can periodically report the location of the proxy shopper to the processor 105 of the payment server 103 and the processor 105 can check the location against the proxy shopper registry 126 to determine if the proxy shopper is proximate a designated store. Alternatively, a list of designated stores (or their locations) can be stored in the mobile device 121 and the processor 130 of the mobile device can use the GPS 129 to determine when the shopper is proximate a designated store.

The user computer 122 can communicate with the payment server 103, the proxy shopper mobile device 121, and the merchant checkout system 102. The user computer 122 can be home computer, such as a desktop computer for example. The user computer 122 can be a cellular telephone or a portable computer, for example. The user computer 122 can communicate with the payment server 103, the mobile device 121, and the merchant checkout system 102 via the Internet 104, for example.

The mobile device 121 and user computer 122 can communicate with the social network 124. The mobile device 121 and user computer 122 can communicate with the social network 124 via the Internet 104, for example.

The social network 124 can be a single social network. For example, the social network 124 can be Facebook, MySpace, or any other social network. The social network 124 can be any combination of different social networks. A combination of social networks can cooperate or otherwise be used to provide information to the proxy shopper.

Figure 2:
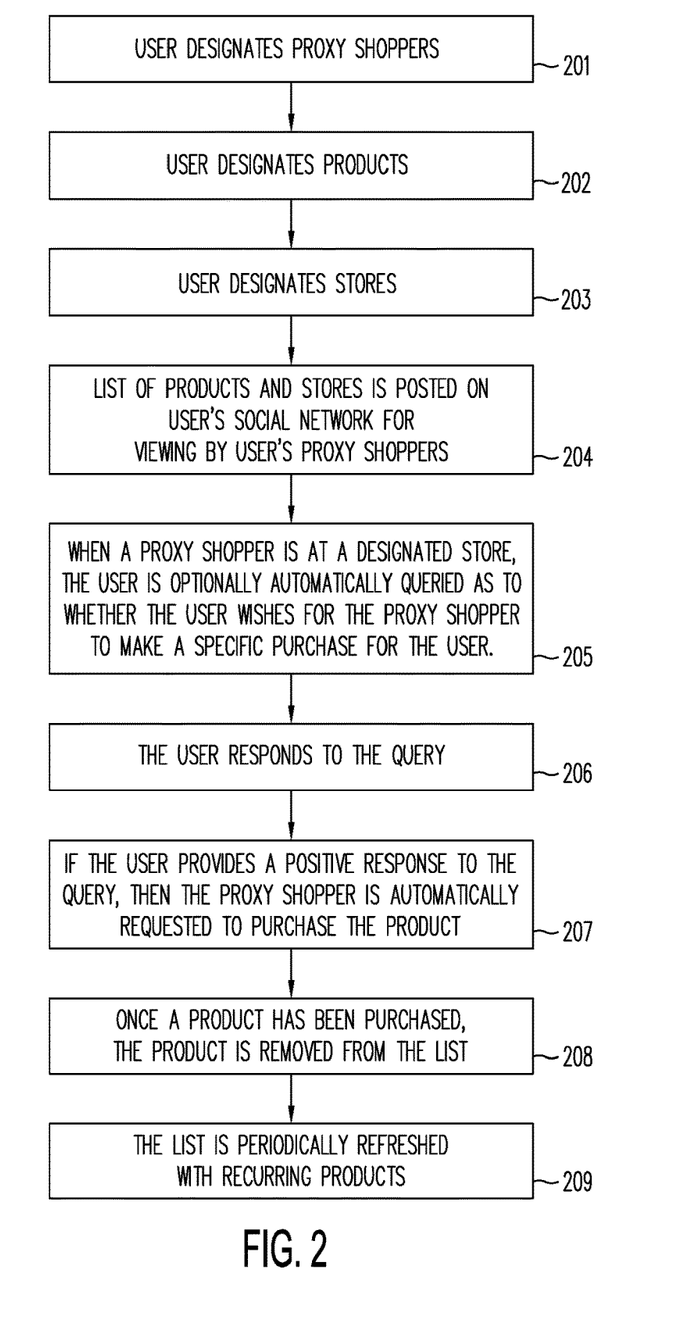
FIG. 2 is a flow chart showing a method for operation of the proxy shopping registry, in accordance with one or more embodiments.

FIG. 2 is a flow chart showing a method for operation of the proxy shopping registry, in accordance with one or more embodiments. The user can designate proxy shoppers, as shown in step 201. The designated proxy shoppers can be those people that the user desires to make purchases for the user. The user can designate products, as shown in step 202. The designated products can be those products that the user desired to have purchased by the proxy shoppers. The user can designate stores, as shown in step 203. The designated stores can be those stores where the user desires the purchases be made by the proxy shoppers. The user can designate the proxy shoppers, the products, and the stores via the user computer 122 or via any other device.

A list of the products and stores can be posted on the user's social network for viewing by the user's proxy shoppers, as shown in step 204. When a proxy shopper is at a designated store, the user can optionally be automatically queried as to whether or not the user wishes for the proxy shopper to make a specific purchase for the user, as shown in step 205. The processor 105 can send the query to the user computer 122.

The user can respond to the query, as shown in step 206. If the user provides a positive response to the query, then the proxy shopper can be automatically requested to purchase the product, as shown in step 207. The processor 105 can send a message to the proxy shopper mobile device 121 requesting the proxy shopper to make the purchase.

The user's response to the query can include which, if any of the products on the list the user desires that the proxy shopper purchase for the user. The user's response can include additional products, e.g., products that are not on the list. Thus, the proxy shopper can purchase products from the list for the user and the proxy shopper can purchase products that are not on the list for the user. The user's response can instruct the proxy shopper not to purchase any products for the user.

Once a product has been purchased, then the product can be removed from the list, as shown in step 208. Removing any products from the list that have been purchased by the proxy shopper helps prevent undesired duplicate purchases. That is, by removing products from the list, other proxy shoppers are less likely to purchase the same products for the same user.

If more that one unit of the product has been listed and the desired number of units of the product have not yet been purchased, then the remaining number of units of the product can remain on the list until the desired number of units of the product have been purchased. For example, if the list contains a listing for five bars of soap and only three bars have been purchased, then the list can be updated to show that two bars of soap are still desired.

The list can optionally be automatically periodically refreshed with recurring products, as shown in step 209. Thus, products that are needed repeatedly can be automatically added to the list. For example, the list can be automatically updated on the first of each month to add food and toiletries that typically need to be replenished periodically. The user can edit the list to add, remove, or change the quantity of any products. The user can be notified of any automatic changes to the list so that the user can be reminded to edit the list as desired. Thus, the processor 105 can periodically replenish selected products on the list of products.

The user can edit the list to add, remove, or change the quantity of any products. The user can be notified of any automatic changes to the list so that the user can be reminded to edit the list as desired.

Note that one or more the steps described herein may be combined, omitted, or performed in a different order as desired or appropriate.

Figure 3:
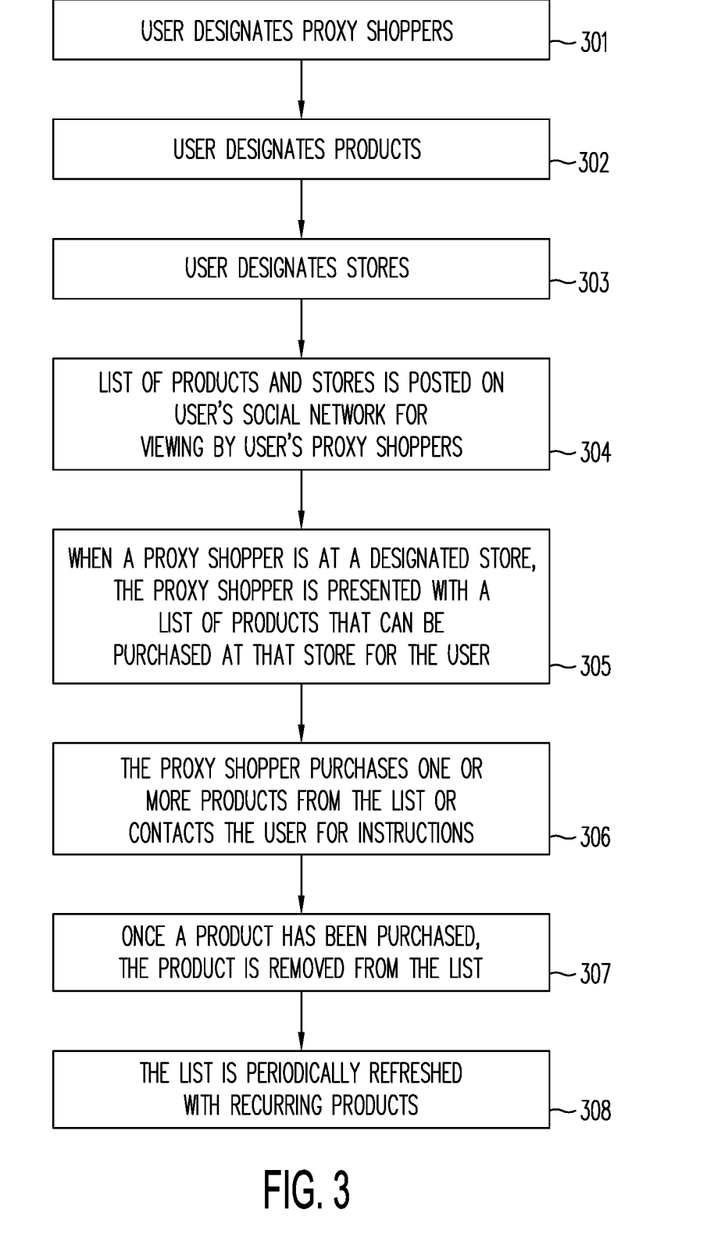
FIG. 3 is a flow chart showing a method for operation of the proxy shopping registry, in accordance with one or more embodiments.

FIG. 3 is a flow chart showing further detail of a method for operation of the proxy shopping registry, in accordance with one or more embodiments. The user can designate proxy shoppers, as shown in step 301. The designated proxy shoppers can be those people that the user desires to make purchases for the user. The user can designate products, as shown in step 302. The designated products can be those products that the user desired to have purchased by the proxy shopper. The user can designate stores, as shown in step 303. The designated stores can be those stores where the user desires the purchases be made by the proxy shopper. The user can designate the proxy shoppers, the products, and the stores via the user computer 122.

A list of the products and stores can be posted on the user's social network for viewing by the user's proxy shoppers, as shown in step 304. When a proxy shopper is at a designated store, the proxy shopper can be presented with a list of products that can be purchased at the store for the user, as shown in step 305. The list of products that can be purchased at the store can be presented on the proxy shopper mobile device 121 or on a device of the store, such as on a display 115 of the merchant checkout system 102. The proxy shopper can purchase one or more products from the list and/or the proxy shopper can contact the user for instructions, as shown in step 306. The user can instruct the proxy shopper as to whether or not to purchase the listed products and can instruct the proxy shopper regarding the purchase of any additional products.

The user can optionally be automatically queried as to whether or not the user wishes for the proxy shopper to make a specific purchase for the user. The processor 105 can send the query to the user computer 122. If the user provides a positive response to the query, then the proxy shopper can be automatically requested to purchase the product. The processor 105 can send a message to the proxy shopper mobile device 121 requesting the proxy shopper to make the purchase.

The processor 105 can authorize payment from the user account to a proxy shopper account of the proxy shopper if the purchaser is the proxy shopper, the product is a product designated for purchase by the proxy shopper, and the store is a store designated for use by the proxy shopper. The user account and the proxy shopper account can be accounts of the same payment provider.

The user's response to the query can include which, if any of the products on the list the user desires that the proxy shopper purchase for the user. The user's response can include additional products, e.g., products that are not on the list. The proxy shopper can purchase products from the list for the user and the proxy shopper can purchase products that are not on the list for the user.

Once a product has been purchased, then the product can be removed from the list, as shown in step 307. If more that one unit of the product has been listed and the desired number of units of the product have not yet been purchased, then the remaining number of units of the product can remain on the list until the desired number of units of the product have been purchased, as discussed above.

The purchase items can be removed from the list automatically, such as by the merchant checkout system 102 communicating purchase information to the processor 105 and/or the social network 124. The purchase items can be removed from the list by the user or the proxy shopper, such as by communicating purchase information to the processor 105 and/or the social network 124.

The list can optionally be automatically periodically refreshed with recurring products, as shown in step 308. Thus, products that are needed repeatedly can be automatically added to the list.

The list can be refreshed with recurring items on predetermined dates. For example, the list can be refreshed with designated items, e.g., milk and eggs, on the first and fifteenth of each month. The list can be refreshed with recurring items a predetermined interval of time after the items are purchased. For example, the list can be refreshed with designated items, e.g. shampoo and hand soap, two weeks after these products have been purchased. The designation of such products and dates and intervals can be provided during a setup process.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services that are provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Figure 4:
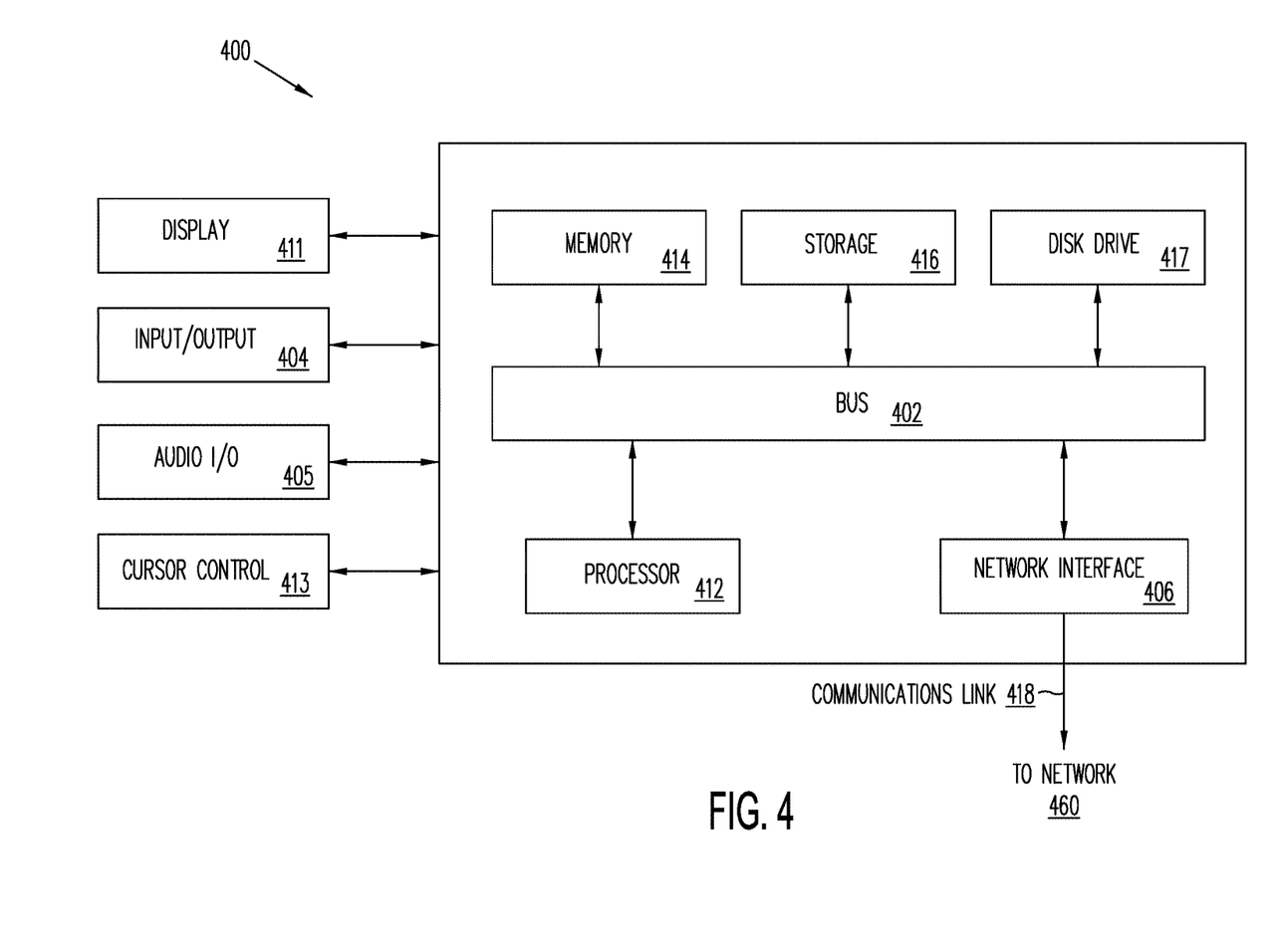
FIG. 4 is a block diagram of a computer system suitable for use in the proxy shopping system, in accordance with one or more embodiments.

FIG. 4 is a block diagram of a computer system 400 suitable for implementing one or more embodiments of the present disclosure. In various embodiments, the proxy shopper mobile device 121 and/or the user computer 122 may comprise the computer system 400. In various implementations, a PIN pad and/or merchant terminal or checkout system 102 may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

With reference to FIG. 1, an example of the operation of the proxy shopping registry is provided below. The user designates specific products to be purchased only at specific stores by the user's proxy shoppers. For example, the user can, via the user computer 122 for example, designate one 2 Gigabyte memory stick at Best Buy, a 5 lbs. box of pretzels at Costco, and a gallon of 2% reduced fat milk from any store.

The list of designated products and stores is provided on the user's social network 124 for viewing by the proxy shopper. The list of designated products and stores can optionally be provided to the proxy shopper mobile device 121 for viewing by the proxy shopper. The list of designated products and stores can be provided to the proxy shopper mobile device 121 via the social network 124 or can be provided to the proxy shopper mobile device 121 from the memory 106 of the payment server.

The user can define similar lists for different proxy shoppers. Each of the lists can contain the same products, different products, or any combination of the same products and different products. Thus, the user can define different lists for different proxy shoppers or different groups of proxy shoppers.

When a proxy shopper is at or near a designated store, the user can automatically be asked whether the user wants the person to make a specific purchase. For example, when the proxy shopper is at Best Buy, the user can be asked if the user wants the proxy shopper to purchase the 2 gigabyte memory stick. If the user confirms that the user wants to have the product purchased, then a message can be sent to the proxy buyer to purchase the product. The message can be sent via voice, e.g., an automated cellular telephone message, email, text messaging, or in any other manner. If the user does not confirm that the user wants to have the product purchased, then no message is sent to the proxy buyer and the proxy buyer can remain unaware of the potential purchase.

Alternatively, when the proxy shopper is at Best Buy, the proxy shopper can see the user's list of products to be purchased at Best Buy. The proxy shopper can then either make the purchase of the 2 gigabyte memory stick or can contact the user to ask for instruction, e.g., to confirm the user's desire for the proxy shopper to make the purchase.

The proxy shopper can be alerted to view a list of products to be purchased at Best Buy for the user by the proxy shopper mobile device 121. The list can be generated from the proxy shopper registry 126 or the proxy shopper registry 126 itself (rather than the list generated from the proxy shopper registry 126) can be viewed. For example, the proxy shopper mobile device 121 can buzz, ring, vibrate, flash, or otherwise alert the proxy shopper to view the list. The alert can be in response to the GPS 129 of the proxy shopper mobile device 121 recognizing the Best Buy as a designated stores, e.g., as being at the location of a designated store.

Once the product, e.g., the 2 gigabyte memory stick, has been purchased, then that product can be automatically removed from the proxy shopper registry 126, so that other proxy shoppers do not make the same purchase from the user.

If the proxy shopper is at an online store, such as when the proxy shopper is shopping from the shopper's home or office on a PC, the proxy shopper may be asked to purchase one or more items from the online store for the user if the online store is designated by the user and/or products on the user list are available through the online store. This can save shipping costs by combining an order and time by the user not having to separately shop online.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

By having others make such purchases according to embodiments of the disclosure, money can be saved (such as for gas) and pollution can be decreased. Further, by having others make such purchases convenience can be greatly increased. On a larger scale, other advantages are possible. For example, traffic congestion can be mitigated. Advantage is taken of the ability of social networks to allow members to readily communication with each other in a manner that facilitates purchases by one person for another person.

The term "product" as used herein can refer to any product, service, or other item. The term "product" as used herein can refer to anything that can be purchased by one person for another person.

The term "social network" as used herein can include an Internet social network such as Facebook or MySpace. The term "social network" as used herein can include a group of the user's friends, relatives, co-workers or the like. For example, the social network can include some or all of the people of a user's contact book (such that of the user's Outlook contacts), employees of the same company as the user, or anyone that the user wants to have in the group. The term "social network" as used herein can include any group of people, businesses, and/or other entities.

The methods and systems described herein can be particularly useful in rural communities where stores can be located a substantial distance away from a user. For example, the nearest Walmart in a rural community can often be more that 40 miles from a user's home. In such instances, it can be very beneficial to have someone else pick up products from a store when they are going there anyway.

The methods and systems described herein can be particularly useful for businesses. Employees of a business can help the business operate more efficiently by making business related purchases for each other. For example, a contractor can be going to Home Depot to purchase some materials for his job site. According to the present disclosure, the contractor can advantageously pick up materials or tools for other job sites of the same business while there. Thus, the methods and systems described herein can define a real-time procurement system.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A device comprising:
a non-transitory memory; and
a processor configured to execute instructions to cause the device to:
designate, by a first user of the device, a second user as a proxy shopper, the proxy shopper including at least one person authorized to make a purchase for the first user;
designate, by the first user of the device, at least one product posted to a social network and at least one store for the purchase by the second user;
receive, over a first communication network, a query whether to notify the second user to purchase the at least one product, the query including a location of the second user;
transmit, over the first communication network, an affirmative response to the query requesting to the second user to purchase the at least one product; and
remove the at least one product from a shopping list of the first user and the social network.

2. The device of claim 1, wherein the location of the second user is in a determined proximity to the designated at least one store.

3. The device of claim 1, executing the instructions further causes the device to:
update the shopping list when the first user adds another product for purchase.

4. The device of claim 1, wherein the first user and the second user are members of the social network.

5. The device of claim 1, wherein executing the instructions further causes the device to:
authorize the purchase of the at least one product, wherein the purchase is paid by a second user account funded by the first user.

6. The device of claim 3, wherein executing the instructions further causes the device to:
transmit, over a second communication network, a request to a second device associated with the second user, to purchase the another product.

7. The device of claim 5, wherein the second user account is funded after the purchase of the at least one product from the designated at least one store.

8. A method comprising:
designating, by a first user of a device, a second user as a proxy shopper, the proxy shopper including at least one person authorized to make a purchase for the first user;
designating, by the first user of the device, at least one product and at least one store for the purchase by the second user;
receiving, over a first communication network, a query whether to notify the second user to purchase the at least one product, the query including a location of the second user determined through a global positioning system (GPS) of a mobile device of the second user;
transmitting, over the first communication network, an affirmative response to the query requesting to the second user to purchase the at least one product; and
removing the at least one product from a shopping list of the first user.

9. The method of claim 8, wherein the location of the second user is in a determined proximity to the designated at least one store.

10. The method of claim 8, further comprising:
updating the shopping list when the first user adds another product for purchase.

11. The method of claim 8, wherein the first user and the second user are members of a social network.

12. The method of claim 8, further comprising:
authorizing the purchase of the at least one product, wherein the purchase is paid by a second user account funded by the first user.

13. The method of claim 10, further comprising:
transmitting, over a second communication network, a request to a second device associated with the second user, to purchase the another product.

14. The method of claim 12, wherein the second user account is funded after the purchase of the at least one product from the designated at least one store.

15. A non-transitory machine-readable medium having instructions stored thereon, the instructions executable to cause performance of operations comprising:
designating, by a first user of a device, a second user as a proxy shopper, the proxy shopper including at least one person authorized to make a purchase for the first user;
designating, by the first user of the device, at least one product and at least one store for the purchase by the second user;
receiving, over a first communication network, a query whether to notify the second user to purchase the at least one product, the query including a location of the second user determined through a global positioning system (GPS) of a mobile device of the second user;
transmitting, over the first communication network, an affirmative response to the query requesting to the second user to purchase the at least one product; and
removing the at least one product from a shopping list of the first user.

16. The non-transitory machine-readable medium of claim 15, wherein the location of the second user in a determined proximity to the designated at least one store.

17. The non-transitory machine-readable medium of claim 15, wherein the operations further comprise:
updating the shopping list when the first user adds another product for purchase.

18. The non-transitory machine-readable medium of claim 15, wherein the first user and the second user are members of a social network.

19. The non-transitory machine-readable medium of claim 15, wherein the operations further comprise:
updating the shopping list with the at least one product based on a date of the purchase or one or more predetermined dates.

20. The non-transitory machine-readable medium of claim 17, wherein the operations further comprise:
transmitting, over a second communication network, a request to a second device associated with the second user, to purchase the another product.

* * * * *